(12) United States Patent  (10) Patent No.: US 6,726,406 B2
Gilmore et al.  (45) Date of Patent: *Apr. 27, 2004

(54) IN SITU FORMATION OF REACTIVE BARRIERS FOR POLLUTION CONTROL

(75) Inventors: Tyler J. Gilmore, Pasco, WA (US); Robert G. Riley, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/888,944

(22) Filed: Jun. 25, 2001

(65) Prior Publication Data

US 2001/0033772 A1 Oct. 25, 2001

Related U.S. Application Data

(63) Continuation-in-part of application No. 09/429,878, filed on Oct. 29, 1999, now Pat. No. 6,416,250, which is a continuation-in-part of application No. 09/429,235, filed on Oct. 28, 1999, now abandoned.

(51) Int. Cl.⁷ .................................................. B09C 1/08
(52) U.S. Cl. ................ 405/128.5; 405/128.7; 405/128.75; 405/128.15
(58) Field of Search ............... 405/128.1, 128.15, 405/128.45, 128.5, 128.7, 129.2, 129.25, 263, 264, 267, 266; 210/747, 170

(56) References Cited

U.S. PATENT DOCUMENTS

| 3,795,113 A | 3/1974 | Chitis |
| 3,904,521 A | 9/1975 | Stopka |
| 4,465,402 A | 8/1984 | ter Meulen |
| 4,842,448 A | 6/1989 | Koerner et al. |
| 4,849,360 A | 7/1989 | Norris et al. |
| 4,850,745 A | 7/1989 | Hater et al. |
| 5,037,240 A | 8/1991 | Sherman |
| 5,205,927 A | 4/1993 | Wickramanayake |
| 5,221,159 A | * 6/1993 | Billings et al. ............. 405/128 |
| 5,228,804 A | 7/1993 | Balch |
| 5,263,795 A | 11/1993 | Corey et al. |
| 5,269,943 A | * 12/1993 | Wickramanayake ........ 210/747 |
| 5,286,141 A | 2/1994 | Vigneri |
| 5,362,400 A | 11/1994 | Martinell |
| 5,387,056 A | 2/1995 | DeLuca |
| 5,456,550 A | * 10/1995 | Devlin ....................... 405/128 |

(List continued on next page.)

OTHER PUBLICATIONS

EPA ground Water Currents, EPA 542–N–00–006, Sep. 2000, Issue 37.

Robert M. Greenwald, Peter A. Rich, L. Donald Ochs, *Field Demonstration of a Permeable Bioreactive Barrier for Leachate Control*, www.regenesis.com, Jan. 5, 2001.

Leslie Pearlman, *Subsurface Containment and Monitoring Systems: Barriers nd Beyond*, Mar. 1999, www.clu–in.org, Jan. 5, 2001.

*Primary Examiner*—Frederick L. Lagman
(74) *Attorney, Agent, or Firm*—Woodard, Emhardt, Moriarty, McNett & Henry LLP

(57) ABSTRACT

A method of treating soil contamination by forming one or more zones of oxidized material in the path of percolating groundwater is disclosed. The zone or barrier region is formed by delivering an oxidizing agent into the ground for reaction with an existing soil component. The oxidizing agent modifies the existing soil component creating the oxidized zone. Subsequently when soil contaminates migrate into the zone, the oxidized material is available to react with the contaminates and degrade them into benign products. The existing soil component can be an oxidizable mineral such as manganese, and the oxidizing agent can be ozone gas or hydrogen peroxide. Soil contaminates can be volatile organic compounds. Oxidized barriers can be used single or in combination with other barriers.

37 Claims, 6 Drawing Sheets

U.S. PATENT DOCUMENTS

| | | | | |
|---|---|---|---|---|
| 5,484,549 A | * | 1/1996 | Hei et al. | 252/103 |
| 5,487,622 A | * | 1/1996 | Cherry et al. | 405/267 |
| 5,514,279 A | * | 5/1996 | Blowes et al. | 210/747 |
| 5,525,008 A | | 6/1996 | Wilson | |
| 5,534,154 A | * | 7/1996 | Gillham | 210/747 |
| 5,566,627 A | * | 10/1996 | Pryor | 405/128 |
| 5,584,605 A | | 12/1996 | Beard et al. | |
| 5,698,092 A | | 12/1997 | Chen | |
| 5,741,427 A | * | 4/1998 | Watts et al. | 210/747 |
| 5,753,494 A | * | 5/1998 | Hater et al. | 405/128 |
| 5,783,088 A | | 7/1998 | Amonette et al. | |
| 5,829,918 A | | 11/1998 | Chintis | |
| 5,833,388 A | * | 11/1998 | Edwards et al. | 405/128 |
| 5,836,390 A | | 11/1998 | Apps et al. | |
| 5,857,810 A | | 1/1999 | Cantrell et al. | |
| 5,879,107 A | | 3/1999 | Kiest et al. | |
| 5,954,452 A | | 9/1999 | Goldstein | |
| 5,967,230 A | | 10/1999 | Cooper et al. | |
| 5,975,800 A | * | 11/1999 | Edwards et al. | 405/128 |
| 6,019,548 A | | 2/2000 | Hoag et al. | |
| 6,027,284 A | | 2/2000 | Prasher et al. | |
| 6,030,467 A | | 2/2000 | Leser et al. | |
| 6,102,621 A | | 8/2000 | Siegrist et al. | |
| 6,127,592 A | | 10/2000 | Knauss et al. | |
| 6,210,078 B1 | * | 4/2001 | Redwine et al. | 405/263 |
| 6,315,494 B1 | * | 11/2001 | Oberle | 405/128.5 |

* cited by examiner

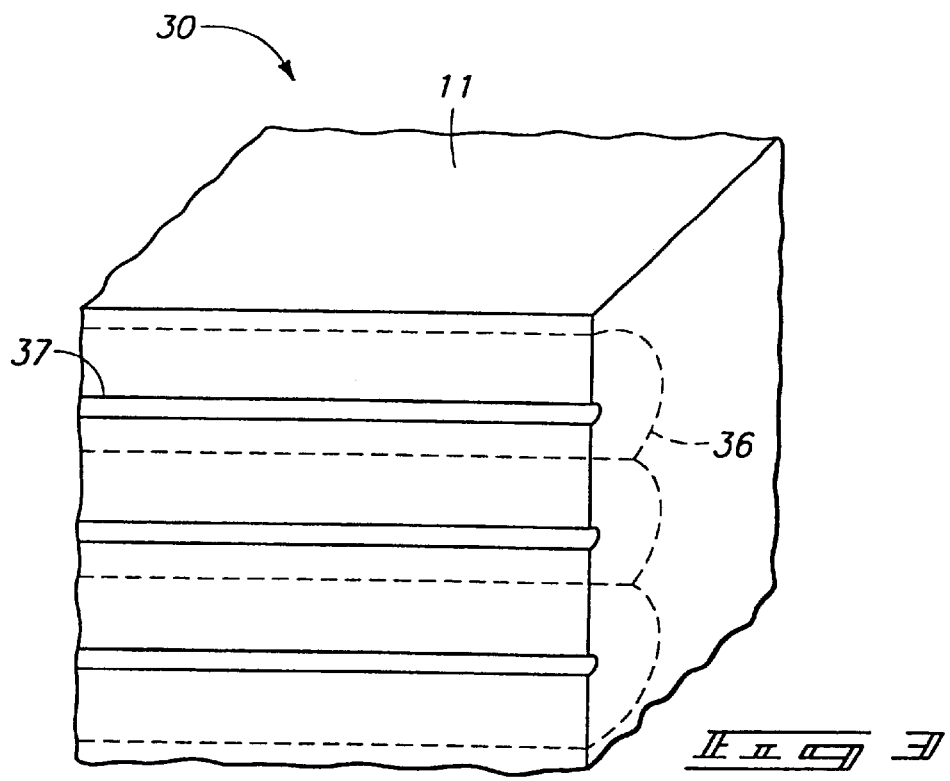
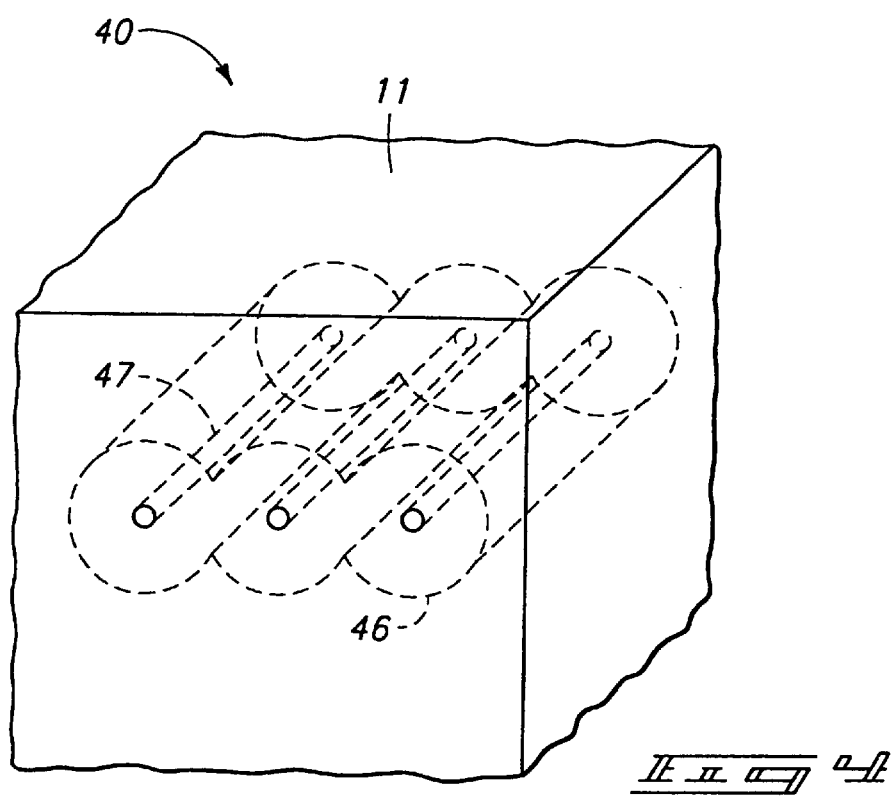

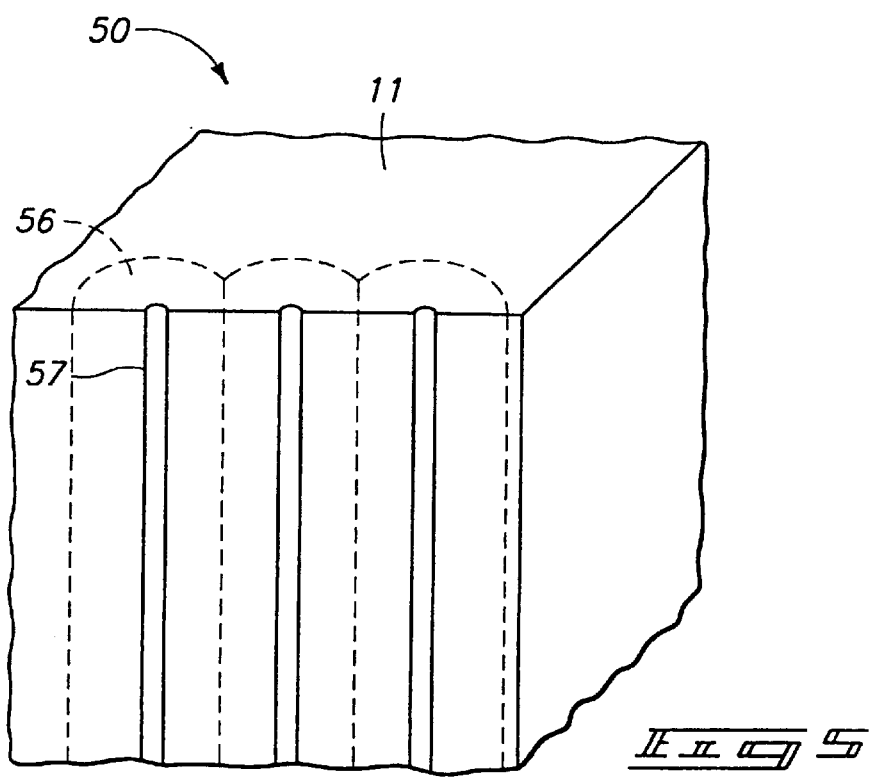
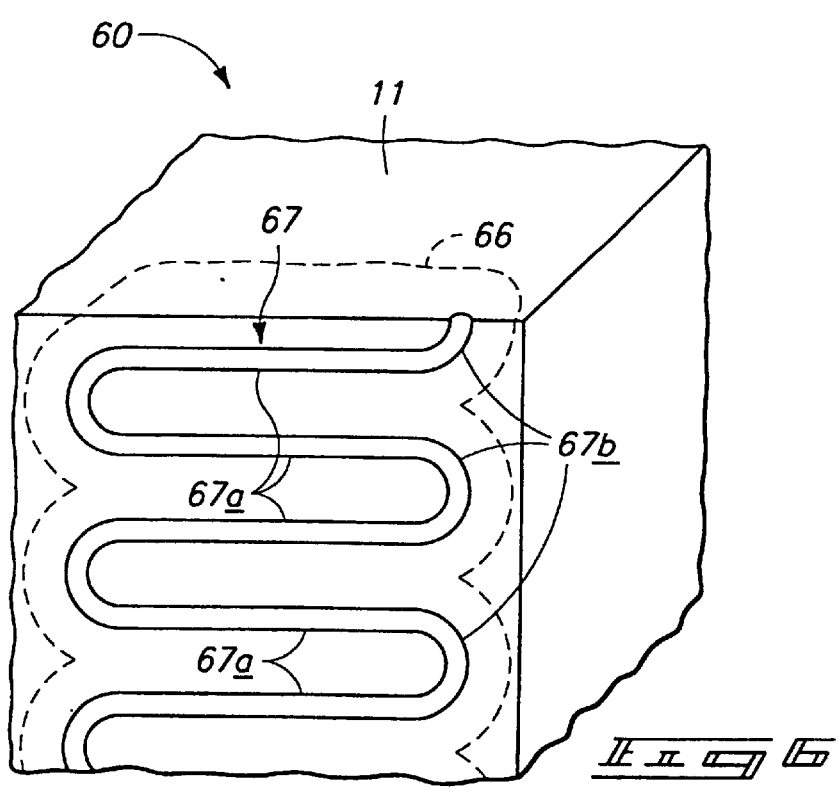

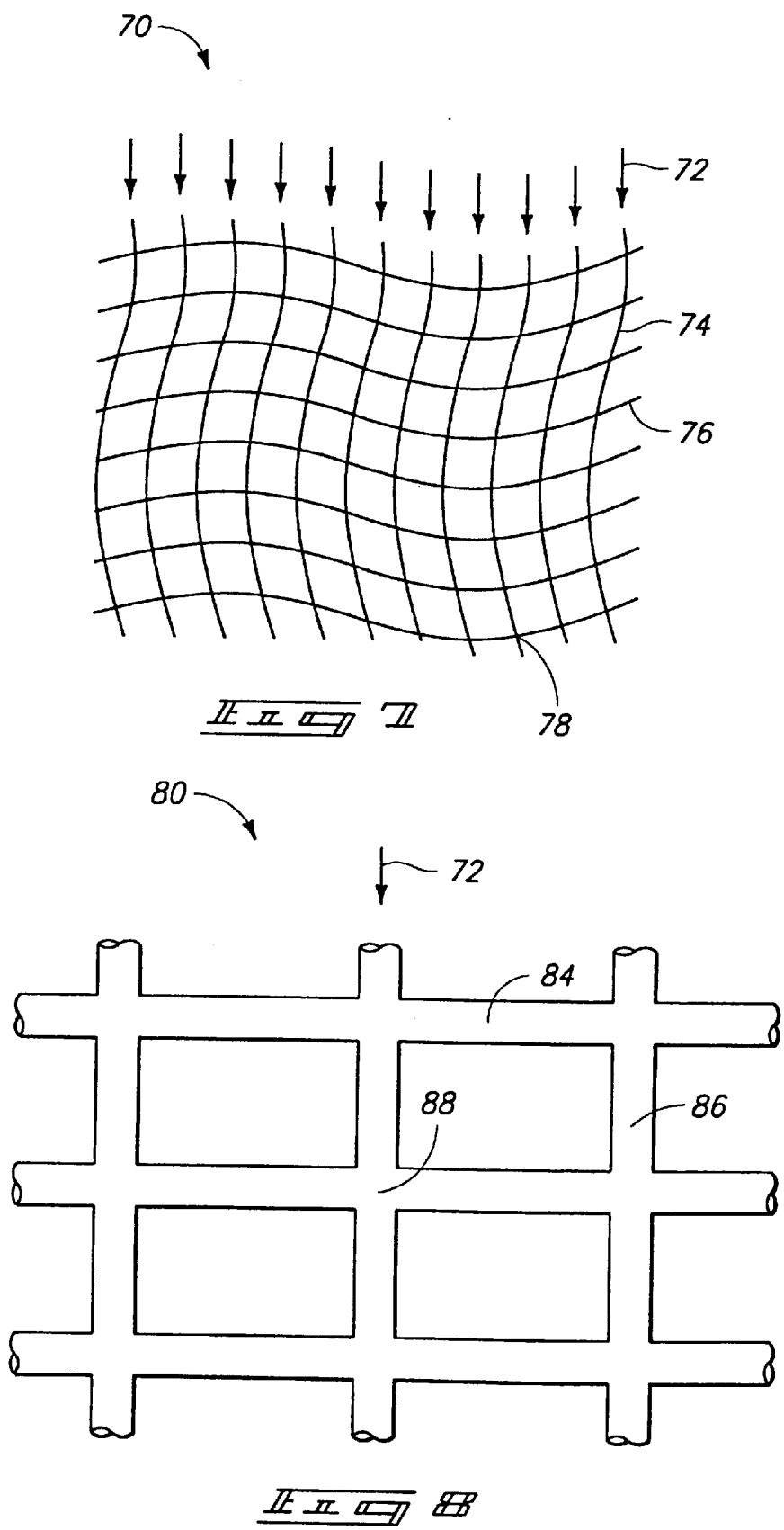

IN SITU FORMATION OF REACTIVE BARRIERS FOR POLLUTION CONTROL

This application is a continuation in part of U.S. application Ser. No. 09/429,878 filed Oct. 29, 1999, now U.S. Pat. No. 6,416,250, the disclosure of which is hereby incorporated by reference, and which is a continuation in part of U.S. application Ser. No. 09/429,235 filed Oct. 28, 1999, now abandoned.

This invention was made with Government support under Contract Number DEAC0676RLO1830 awarded by the U.S. Department of Energy. The Government has certain rights in the invention.

FIELD OF THE INVENTION

The invention relates to methods and apparatuses for delivering reagents and forming reactive barriers for pollution control.

BACKGROUND OF THE INVENTION

One persistent global challenge is the management and remediation of pollution. Pollution can take several forms, one of which includes land or soil pollution. Soil at a variety of depths beneath the ground's surface can become contaminated with pollutants from a wide variety of sources. Soil pollution includes contamination of soil in the Vadose zone, meaning soil that is not saturated with water between the ground surface and a point below the ground surface where the soil becomes saturated with water. Soil pollution can also occur in groundwater, meaning any regions of the soil below the Vadose zone that are saturated with water.

Contamination from a point source in the Vadose zone can disburse outward from the source. Contaminants can also disburse from the Vadose zone into underlying groundwater. Groundwater typically has a gradient or flow pattern, wherein groundwater flows through the saturated soil matrix while solid soil particles remain in place. Accordingly, when contaminants reach groundwater, the contaminants can potentially spread with the groundwater more rapidly than they would otherwise from dispersion in the Vadose zone.

The problem of contaminants spreading by dispersion in the Vadose zone, groundwater flow, or other mechanisms is widely recognized. Accordingly, a wide variety of methods and apparatuses have been developed to counteract contamination of increasingly large areas of soil caused by contaminants spreading.

One such technology provides the creation of reactive barriers in soil that can be contacted with contaminated groundwater or dispersion from contaminated Vadose zone soil. A reactive barrier can be established by digging a trench into which a reactive substance can be placed and then backfilling the trench. One such reactive substance includes zero-valent iron in the form of iron filings that acts as a reducing agent on a variety of contaminants. Groundwater containing targeted contaminants can flow through the iron filings deposited in a trench and flow out of such iron filings as treated ground water.

While some success has been achieved in establishing reactive barriers in trenches, the life of such a barrier is finite. Depending on a variety of conditions, including the level of contamination, the reagents in the barrier will ultimately be consumed. Once the reaction with contaminants ceases, additional reactive materials must again be placed in a trench and backfilled to continue the treatment of groundwater in situ.

It would be very unusual for a reactive barrier, as described above, to maintain its reactivity long enough to effectuate complete treatment of groundwater contaminates. Rather, the most common circumstance is that protection against spreading of contaminates will endure for a time and then cease. Thus, a need exists for reactive barriers that will persist long enough to prevent contaminant spreading as long as the contamination exists. Improved techniques are also needed for efficiently constructing reactive barriers and for creating more effective barriers that minimize the disruption to the existing soil. Such reactive barriers are needed to alleviate the spreading of groundwater contamination as well as Vadose zone contamination. Without such advances, the current challenges of isolating and remediating soil contamination will continue to exist.

SUMMARY OF THE INVENTION

In accordance with one aspect of the invention, soil contamination is treated by forming a barrier of oxidized soil material. The oxidized barrier is formed by delivering an oxidizing agent into the ground to oxidize an existing soil component, and the barrier is formed in the path of contaminate migration to neutralize percolating soil contamination. The oxidized material reacts with soil contaminate migrating into the barrier to reduce the level of the soil contaminate migrating through the barrier to acceptable levels. The existing soil component can be a naturally occurring mineral, such as manganese, and the oxidizing agent can be ozone.

In accordance with another aspect of the invention, a reagent delivery method includes positioning reagent delivery tubes in contact with soil. The tubes can include a wall that is permeable to a soil-modifying reagent. The method further includes supplying the reagent in the tubes, diffusing the reagent through the permeable wall and into the soil, and chemically modifying a selected component of the soil using the reagent. The tubes can be in subsurface contact with soil, including groundwater, and can be placed with directional drilling equipment independent of groundwater well casings. The soil-modifying reagent includes a variety of gases, liquids, colloids, and adsorbents that may be reactive or non-reactive with soil components. In accordance with various aspects of the invention, the method may be used to form reactive barriers, control pests, enhance soil nutrients for microbes and plants, and serve other functions.

BRIEF DESCRIPTION OF THE DRAWINGS

Preferred embodiments of the invention are described below with reference to the following accompanying drawings.

FIGS. 1–6 are perspective views of various isometric soil portions.

FIGS. 7–9 are side views of exemplary reagent distribution matrices.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
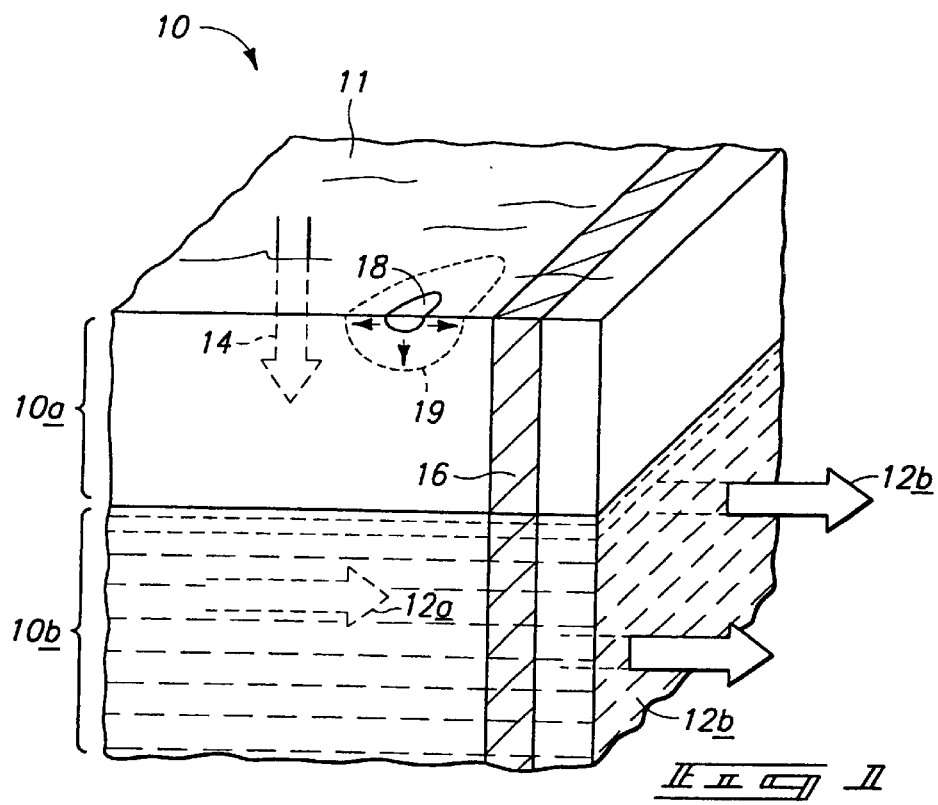

FIG. 1 illustrates a soil portion 10 including a Vadose zone 10a and an area of water-saturated soil (i.e., groundwater)

10b. In the context of this document, the terms "soil" and "soil portion" comprise all matter at and below the ground surface, regardless of its location or composition. For example, matter at and below the floor of a body of water is within the meaning of "soil." Accordingly marine sediment is considered soil. Also accordingly, "soil" and "soil portion" include all of the solid, liquid, and/or gaseous components of such soil.

Figure 2:
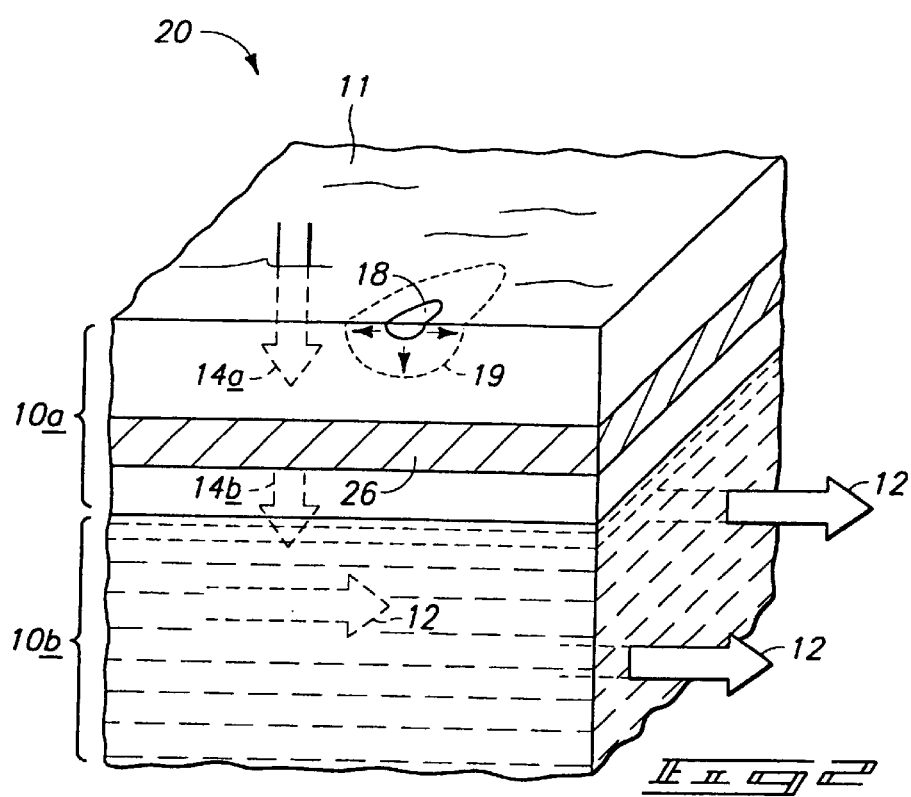

Vadose zone 10a extends from a ground surface 11 downward to the point where soil becomes saturated with water and groundwater 10b begins. Multiple regions of water-saturated soil can exist below Vadose zone 10a forming a variety of groundwater regions or aquifers. FIGS. 1 and 2 have been drawn simplified form for the sake of explanation but do not limit the present invention to application in only one groundwater region, aquifer, or other soil portion saturated with water. FIG. 1 also illustrates a direction of flow for a contaminated groundwater flow 12a in groundwater 10b. The infiltration of a surface water flow 14 is indicated downwardly from ground surface 11 into Vadose zone 10a and toward groundwater 10b. Sources of surface water flow 14 include, for example, rainfall and above-ground bodies of water. An area of a modified soil 16 is formed in soil portion 10. A contaminant source 18 is also illustrated along with a boundary line for a disbursed contaminant 19. FIG. 2, illustrating soil portion 20, includes all the elements of soil portion 10 illustrated in FIG. 1, except that an area of a modified soil 26 is provided in the alternative to modified soil 16.

One difference between modified soil 16 and modified soil 26 is their respective orientation. Modified soil 16 is shown oriented approximately vertically and extending from ground surface 11 through Vadose zone 10a and into groundwater 10b. Depending on the intended function for modified soil 16, such modified soil may or may not extend fully through soil portion 10 as shown in FIG. 1. Rather, it is conceivable that modified soil 16 can only exist within Vadose zone 10a, within groundwater 10b, or in some other configuration. Similarly, modified soil 26 can exist at any depth below ground surface 11, including zero depth, or at ground surface 11. It is further conceivable that modified soil 16 can be oriented in some fashion other than indicated in FIG. 1, approximately vertically, or in FIG. 2, approximately horizontally. For selected purposes, some of which are described herein, certain advantages may exist to orienting modified soil 16 approximately vertically and modified soil 26 approximately horizontally One aspect of the present invention provides a method for reagent delivery that includes positioning one or more reagent delivery tubes in contact with the soil. If desired, the reagent delivery tubes can be in subsurface contact with the soil. At least a portion of at least one of the tubes can comprise a wall that is permeable to a soil-modifying reagent. The reagent can be supplied into the tube, diffusing the reagent through the permeable wall and into the soil. Once in the soil, the reagent can be used to chemically modify a selected component of the soil. Soil components can include any solid, liquid, and/or gas, in particular, groundwater and components within its liquid phase. Notably, the reagent delivery tubes can be positioned in a variety of configurations to accomplish the above-described aspect of the present invention, as well as other aspects. Accordingly, the above-described reagent delivery method can be used to establish an area of modified soil, such as modified soil 16 or modified soil 26. The approximately vertical orientation of modified soil 16, the approximately horizontal orientation of modified soil 26, or some other orientation can be established by the positioning of the reagent delivery tubes.

There exists at least three mechanisms envisioned by the present invention in which soil or its properties can be modified. First, a reagent can react directly with a contaminant or other solid component. Second, a secondary reaction of a reagent with a contaminant can occur, such as when oxygen enhances already existing microbial reactions. Third, modification of soil components or soil properties can cause existing soil components to react with contaminants. Such is the case when hydrogen sulfide reduces existing iron oxide in soil, thus allowing reduced iron to react with contaminants or other components. Sodium dithionite can also be used to reduce naturally occurring iron in soil. Iron can also be introduced into soil as a colloid. Other reducing agents include ammonium oxalate. Examples of adsorbents include quaternary ammonium amine compounds and surface-modified clay colloids.

In another aspect of the invention, an oxidizing agent is used to form a reactive barrier by modifying the soil according to this third mechanism. An oxidizing agent can be introduced to react with existing soil components to create an oxidized reactive barrier that in turn reacts with contaminants. For example, ozone can be used to oxidize naturally occurring minerals in the soil. The oxidized form of the mineral can then react with constituents such as metals, organics, and radionuclides associated with or moving through the oxidized zone under natural gradients.

FIG. 3 illustrates a soil portion 30 including reagent delivery tubes 37 in subsurface contact with a soil as indicated by their position below ground surface 11. A reagent is supplied in tubes 37 and diffused through the permeable walls and into soil portion 30 as indicated by a boundary surrounding each tube 37 indicating the extent of a modified soil 36. In FIG. 3, the areas of modified soil 36 surrounding tubes 37 are shown to overlap. Tubes 37 are positioned substantially parallel to one another and a majority of tubes 37 are approximately coplanar. More specifically, each of tubes 37 lie in the same approximately vertical plane and, thus, all of tubes 37 are coplanar. Accordingly, the overlapping areas of modified soil 36 form a substantially vertical overall area of modified soil analogous to modified soil 16 shown in FIG. 1. It is conceivable that tubes 37 could also be positioned substantially parallel to one another, but with less than a majority of tubes 37 being substantially coplanar. Depending on the particular arrangement, an overall area of modified soil analogous to modified soil 16 shown in FIG. 1 could nevertheless be formed.

It should be noted that soil portion 30 of FIG. 3 is presented in a more simplified form compared to soil portions 10 and 20 in FIGS. 1 and 2. Even though no distinction is made in soil portion 30 as to a Vadose zone or groundwater, modified soil 36 can exist in any Vadose zone, groundwater, and/or other region of a soil portion presented herein or otherwise in existence.

Further note should be made that each of tubes 37 possesses a longitudinal axis that is oriented within about 45° of horizontal. More specifically, assuming ground surface 11 is approximately horizontal, each of tubes 37 is also approximately horizontal. The advantages to be obtained by orienting reagent delivery tubes with about 45° of horizontal are surprising. One such advantage is that such positioning allows the use of directional drilling equipment to emplace tubes 37. Directional drilling equipment is currently being used in the placement of electrical and other underground transmission cables. The technology allows placement of such cables at varying depths and horizontal runs of varying lengths. If a horizontal run is not desired, then the technology will allow an angled run, for example within about 45° of horizontal.

Placing tubes 37 approximately horizontal can provide several advantages. One advantage is that delivery of reagent to a large region in the path of moving groundwater can be accomplished with minimal disturbance of the ground surface. From a starting location, a tube 37 can be extended to a distance as great as the directional drilling equipment will reach. Subsequent tubes 37 may be placed at other depths, perhaps from the same starting location, to established a desired arrangement of tubes 37. If conventional vertical well casings were instead used for reagent delivery, then conventional drilling equipment would set up and drill every several feet for each well casing. Thus, tubes 37 can be placed to intercept groundwater with a minimum of access holes relative to conventional techniques. Further, tubes 37 could be placed to maximize contact with a selected geologic strata that may preferentially contain contaminants.

Tubes 37 may also be placed substantially parallel and substantially coplanar with directional drilling equipment. Given potential variations in precise placement of tubes 37, some misalignment from exactly parallel or an exact plane may occur, but can be acceptable in many cases. Areas of modified soil 36 can be designed to overlap such that substantially parallel and substantially coplanar tubes 37 nevertheless provide a desired effect.

Another advantage of the various aspects of the present invention is that minimal energy is required to operate the technology. A reagent flow can be provided to the apparatus using a gravity-fed tank or container. Alternatively, a pump can be utilized to supply the apparatus. Gaseous reagents can similarly be provided from a pressure-regulated vessel. As a result of such features, the present invention can be considered to provide a semi-passive reactive barrier. Such is opposed to a passive reactive barrier, one example of which his solid iron filings placed in a trench and backfilled.

Still another advantage of the various aspects of the invention is that enhanced delivery of reagents to surrounding soil can be achieved. Reagents may be supplied to modify soil in bulk form, that is, for gases, as gas bubbles, and for liquids, as droplets or stream flow. Particularly in the case of gases, bubbles do not diffuse reagents into soil in an efficient manner. By comparison, molecular diffusion of reagents through a permeable wall and into surrounding soil provides the reagents in a form that will readily modify selected soil properties or components. If bubbles are instead provided, then the reagents in the gas bubbles can diffuse from bubbles into the same molecular form provided from a reagent delivery tube with a permeable wall. Accordingly, improved modification and dispersion of reagents delivered through a tube can be provided in the various aspects of the present invention.

A variety of materials may be used to enable molecular diffusion through a permeable wall of a reagent delivery tube. Generally, such materials are preferably substantially amorphous. A highly cross-linked polymer material may hinder diffusion, but a less cross-linked material can allow more diffusion. A material that is completely amorphous, with no particular ordered arrangement of molecules and/or atoms, will often allow the most diffusion. The desired degree to which the material comprising a permeable wall is amorphous may depend on the particular reagents to be diffused and the desired diffusion rate. A few examples of suitable materials include silicone tubing, neoprene tubing (synthetic rubber available from Norton Performance Plastics in Wayne, N.J.), and TYGON™ tubing (silicone tubing also available from Norton Performance Plastics). Natural rubber, gum rubber, substantially amorphous polyurethane, and substantially amorphous polyethylene may also be suitable.

Conventionally, subsurface reagent delivery equipment has utilized installation of a perforated or otherwise porous well casing. Once installed, reagents can be directly injected into the conventional well casing and thereafter diffuse into surrounding soil. By comparison to the various aspects of the present invention, subsurface reagent delivery through a perforated well casing is rather limited and ineffective. Placing perforated well casings in the positions shown for tubes 37 in FIG. 3 would require excavation and backfilling. Yet, directional drilling equipment can quite easily place tubes 37 parallel to one another in a vertical plane, wherein tubes 37 are placed at varying depths below ground surface 11. Further, placing reagent delivery tubes in contact with soil provides release of reagent directly to an affected area.

Other methods for placing tubes 37 in the described positions are also available. For example, one tube 37 can be placed in the bottom of a trench which is then backfilled to the point where a second tube 37 is to be placed. Successive backfilling and placement of additional tubes 37 will result in the orientation illustrated in FIG. 3. In more detail, such a method includes exposing subsurface soil, placing one or more of tubes 37 in contact with the subsurface soil, and backfilling the exposed subsurface soil.

FIG. 4 illustrates soil portion 40 wherein reagent delivery tubes 47 are positioned in subsurface contact with soil portion 40 below ground surface 11. By supplying a reagent in tubes 47, an area of modified soil 46 can be established surrounding each tube 47. In FIG. 4, the longitudinal axis of each tube is oriented approximately horizontally, tubes 47 are approximately parallel, and each tube 47 is approximately coplanar. However, in contrast to tubes 37 in FIG. 3, tubes 47 in FIG. 4 are positioned in an approximately horizontal plane. Accordingly, the overlapping areas of modified soil 46 form an overall area of modified soil similar to modified soil 26 illustrated in FIG. 2. The positions shown in FIG. 4 are also conducive to placement either by directional drilling equipment or by exposing subsurface soil and backfilling after placing tubes in contact with the subsurface soil. As an alternative to FIG. 4, tubes 47 could be arranged radially, extending outward from a common area of origin. Tubes 47 could still be positioned in an approximately horizontal plane, but they would not be parallel.

FIG. 5 illustrates soil portion 50 with tubes 57 positioned with their longitudinal axes approximately vertical. Even though tubes 57 are not within about 45° of horizontal, tubes 57 are approximately parallel and approximately coplanar. Thus, the overlapping areas of modified soil 56 form an overall area of modified soil similar to modified soil 16 illustrated in FIG. 1. Tubes 57 can be placed using directional drilling equipment or by exposing subsurface soil and backfilling after placing tubes 57 in contact with the subsurface soil. As an alternative to FIG. 5, tubes 57 could be arranged radially, extending downward from a common area of origin. Tubes 57 could still be positioned in an approximately vertical plane, but they would not be parallel.

In FIG. 6, soil portion 60 includes ground surface 11 below which tube 67 is placed in subsurface contact with soil. Tube 67 includes a plurality of parallel tubular sections that are approximately linear. Linear sections 67a are shown with their longitudinal axis oriented approximately horizontally. Alternatively, although now shown, the longitudinal axes of linear sections 67a could be oriented approximately vertically or at some other position. Tube 67 further includes one or more curved sections 67b joined to linear sections 67a to form a serpentine pattern.

Although linear sections 67a of tube 67 are approximately parallel and approximately coplanar in the shown configuration, other configurations are, of course, possible. A plane defining the relative position of linear sections 67a is approximately vertical in the shown configuration. Tube 67 thus produces an area of modified soil 66 that is approximately vertical, resembling modified soil 16 of FIG. 1. Alternatively, tube 67 can be oriented as shown but with the plane defining the position of linear sections 67a oriented approximately horizontally. In such a configuration, an area of modified soil would be produced resembling modified soil 26 of FIG. 2.

The various tubes of FIGS. 3, 4, and 6 individually comprise a major portion sized and oriented to provide an individual vertical distance of reagent distribution in the soil and an individual horizontal distance of reagent distribution in the soil greater than the vertical distance. In FIG. 5, unless the length of tubes 57 is unusually shallow, the horizontal distance of reagent distribution is less than the vertical distance. If the length of tubes 57 is less than the horizontal distance of reagent distribution indicated by the area of modified soil 56, then the horizontal distance of reagent distribution could be greater than the vertical distance for tubes 57.

FIG. 6 further illustrates tube 67 including one or more curved sections and a plurality of approximately linear sections, wherein the major portion of each tube comprises one of the linear sections. Also in FIGS. 3, 4, and 6, a longitudinal axis of the major portion of one or more individual tubes is oriented within about 45° of horizontal. As described, individual tubes are more specifically oriented approximately horizontally.

The various tubes of FIGS. 3–6 can be in subsurface contact with both soil and groundwater. Further, selected portions of the tubes may be permeable to a soil-modifying reagent while other portions are not permeable. Thus, selected portions of soil can receive the reagent diffusing through the permeable wall while other portions do not. Such a configuration would allow a tube to extend from ground surface 11 through Vadose zone 10a and into groundwater 10b without releasing any reagent into Vadose zone 10a, but instead affecting groundwater 10b or a portion thereof.

The materials and constructions of the tubes can vary depending on the reagent to be dispersed with the tubes. In one aspect of the invention, the permeable wall of a reagent delivery tube can comprise a shell having openings therein and a reagent permeable liner in contact with an inner surface of the shell. By this means, a thin permeable liner can be provided with structural integrity sufficient so that it can be placed in subsurface contact with soil. It may further be desirable that the opening in the shell forming the permeable wall comprise pores that are intrinsic to a material comprising the shell. Pores intrinsic to a material can be distinguished from orifices mechanically formed in a shell. Of course, tubes can be used having a permeability intrinsic to the material comprising a shell such that no permeable liner is required.

The permeability of the permeable wall of a tube depends upon the particular reagent to be delivered. The particular reagent depends upon the objective of modifying the soil. One advantage of the present invention is that it chemically modifies a selected component of the soil using the reagent. The soil modifying reagent can comprise a gas, a liquid, a colloid, or yet other materials, but preferably a gas. Any of such reagents may further be described as a reducing agent, an oxidizing agent, a microbe, an enzyme, or an adsorbent. Each of such reagents may chemically modify a selected component in the soil. The soil may be chemically modified by treating a contaminant found therein. Alternatively, a reagent may produce a chemically modified component of the soil that in turn reacts with a soil contaminant, even though the reagent does not directly react with a soil contaminant. Examples of a few soil contaminants include a metallic ion, a hydrocarbon, or a halogenated hydrocarbon.

Another advantage of the present invention is that it can modify a selected property or component of at least one of the soil and groundwater using a gaseous reagent. In such case, a gas permeable tube wall is preferred. Possible soil modifying reagents to accomplish such an advantage include a reducing agent, an oxidizing agent, an oxygen source, an oxygen displacer or scavenger, a microbial nutrient, a co-metabolite, a pesticide, a fertilizer, or a herbicide, each of which may be provided in a gaseous form.

Some of such reagents are not reactive with soil components, while others can be selected to react with a soil contaminant. Gaseous reducing agents and oxidizing agents may chemically modify components of the soil, including contaminants. An oxygen source can be used to enhance a microbial reaction occurring in the soil, wherein the microbial reaction chemically modifies a selected component of the soil. Thus, supplying an oxygen source modifies the property of oxygen content in soil, rather than modifying a particular component of soil. Providing an oxygen displacer or scavenger is analogous except that an anoxic condition can be created. Generally, an anoxic condition might be desired for other microbial reactions. A microbial nutrient can provide a similar enhancement. A pesticide may also be supplied to provide the advantage of pest control in a selected soil portion. Fertilizer may be provided to enhance plant growth in a selected soil portion. A herbicide may be provided to suppress plant growth in a selected soil portion.

Another aspect of the invention comprises a reactive reagent reacting with a selected component of the soil. Accordingly, creating an area of modified soil as depicted in FIGS. 1–6 can create a rechargeable reactive barrier. That is, a reactive reagent may be supplied from reagent delivery tubes to a selected soil portion where the reagent will react with existing selected components in such soil portion. As illustrated in FIG. 1, contaminated groundwater 12a flows through modified soil 16. Assuming modified soil 16 is a rechargeable reactive barrier, contaminants or other soil components moving with contaminated groundwater flow 12a will pass through the rechargeable reactive barrier for treatment. Treated groundwater flow 12b then flows out from the rechargeable reactive barrier. A continuous supply of reactive reagent into modified soil 16 will match the continuous supply of soil contaminants or other components flowing with groundwater 10b.

Referring to FIG. 2, assuming modified soil 26 is a rechargeable reactive barrier, any contaminant or other soil component infiltrating with contaminated surface water flow 14a will pass through the rechargeable reactive barrier. Treated surface water flow 14b then enters groundwater 10b. One potential use for such a method is in preventing contamination of groundwater with organic and inorganic byproducts of a cattle feed lot, including viruses. Other analogous uses are also conceivable. Examples of reactive reagents, which happen to be gaseous reactive reagents, include chlorine, sulphur dioxide, bromine, acetylene, ozone, hydrogen sulfide, or combinations thereof. Some of such reagents can provide reaction with a selected component in the soil and subsequent reaction of the selected component with a soil contaminant. Of course, a gaseous, reactive reagent can also react directly with a contaminant.

Where the reagent is ozone, the ozone can react with an existing mineral in the soil to create an oxidized zone or barrier. Such an oxidized barrier can react with soil contaminates percolating through the zone to degrade the contaminates into benign species. In one example, existing manganese in the soil can be oxidized to permanganate by ozone. The formed permanganate can then react with soil contaminates, such as TCE and DCE, to form degraded contaminates and benign products.

A rechargeable, reactive barrier may similarly be established through a microbial reaction. Such microbial reactions can be enhanced by providing an oxygen source or an oxygen displacer or scavenger as required by the particular type of reaction. A microbial nutrient or a co-metabolite are other reagents that may be supplied according to the present invention to enhance the microbial reaction.

In another aspect of the invention, pest control can be provided by positioning one or more reagent delivery tubes in contact with a soil. At least a portion of at least one of the tubes can comprise a wall that is permeable to a pest control reagent. The pest control reagent can be supplied in the tube and diffused in an effective amount through the permeable wall and into the soil. If desired, the reagent delivery tubes can be in subsurface contact with the soil. One potential agricultural aspect includes placing reagent delivery tubes in furrows of an agricultural field and supply pesticide. An example of a pest is a root nematode. Such a method can enhance the safety of using some pesticides, such a methyl bromide, and also reduce the amount required by localizing application in the area most needed.

Another use of pesticide reagent delivery tubes involves protecting subsurface structures from pest damage or infestation. Examples of pests include termites and ants. Tubes may be positioned an effective distance from a subsurface structure to effectuate a pest control in soil juxtaposed with the structure. Such may be accomplished with directional drilling equipment, the trench and backfill method described above, or perhaps other methods. In a similar manner, plant control can be provided by positioning one or more herbicide reagent delivery tubes in contact with a soil. Such may be useful in suppressing plant growth in designated areas and suppressing root damage of subsurface structures.

Figure 9:
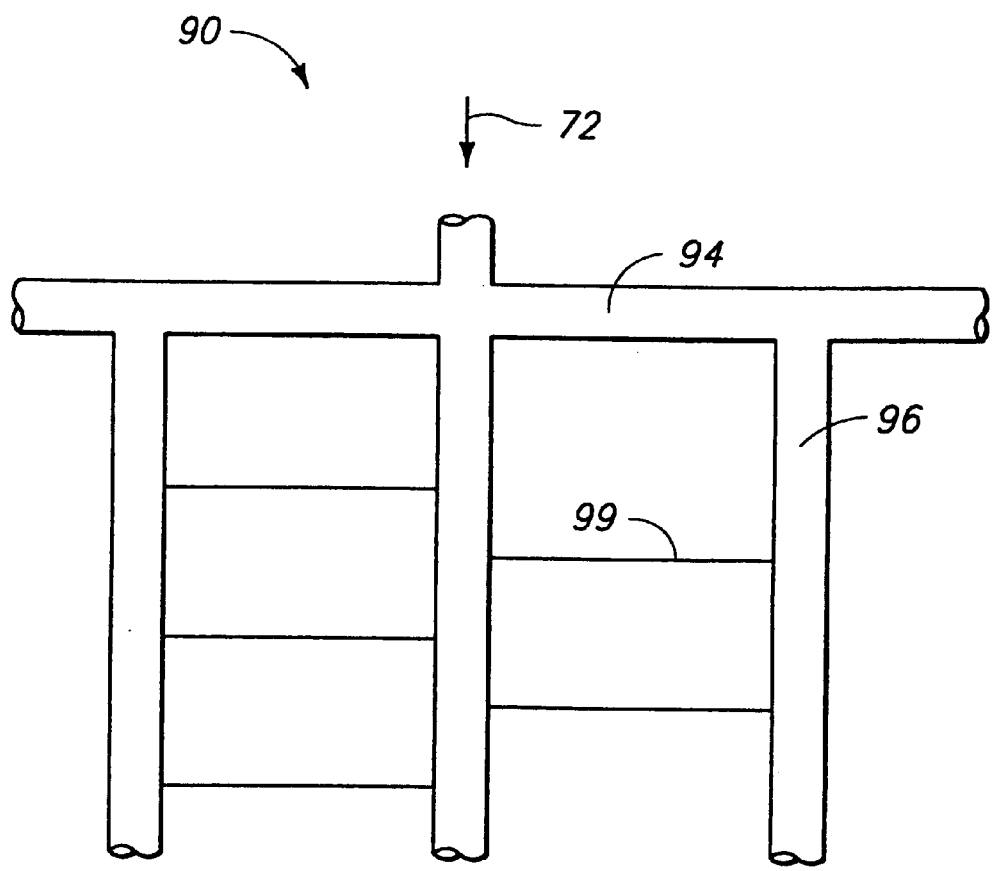

FIGS. 7–9 illustrate further aspects of the present invention with their depiction of a few examples of alternative embodiments to the reagent delivery tubes illustrated in FIGS. 3–6. One difference between the tubing of FIGS. 3–6 and the tubing of FIGS. 7–9, is that the latter are linked together such that a preselected spacing between tubing sections is provided and maintained when the apparatuses are positioned in or on soil. Because of the linked feature, the apparatuses of FIGS. 7–9 will generally be installed in trenches or other excavations that are then backfilled. Notably, such trenches or other excavations exposing the subsurface soil may be constructed in a manner that allows the apparatuses of FIGS. 7–9 to be positioned in an approximately vertical plane, an approximately horizontal plane, or even some other plane. Further, assuming that the apparatuses of FIGS. 7–9 are at least somewhat flexible, the apparatuses could be oriented such that tube sections are not necessarily coplanar. For example, such apparatuses could be placed in a curved trench or some other nonplanar trench or excavation.

Nevertheless, because the apparatuses of FIGS. 7–9 include reagent delivery tube sections, they may be used in the methods described above to form modified soil portions, such as modified soil 16, modified soil 26, or yet other areas of modified soil. It is not presently anticipated that the apparatuses of FIGS. 7–9 can be installed using directional drilling equipment. Nevertheless, it is conceivable that currently existing or later developed equipment could potentially be used to position the apparatuses of FIGS. 7–9. A method may be used other than one requiring exposure of subsurface soil, placement of the apparatuses, and backfilling the exposed subsurface soil.

In FIG. 7, a magnified view of a geotextile fabric forming a matrix 70 is illustrated. A reagent flow 72 can be introduced into hollow tubular sections 74, hollow tubular sections 76, or both. Matrix 70 of FIG. 7 can be a woven fabric, wherein tubular sections 74 and tubular sections 76 intersect at cross-overs 78. Since tubular sections 74 and tubular sections 76 intersect at cross-overs 78, they can additionally be linked in some fashion at cross-overs 78. If matrix 70 is woven then tubular sections 74 and 76 will likely remain in their respective positions without some sort of line at cross-overs 78. However, if matrix 70 is not woven or if the gaps between approximately parallel tubular sections are large enough to allow shifting, then such linking may be desired.

It is further noted that only a portion of tubular sections 74 or 76 may comprise reagent delivery tubes and yet matrix 70 may still accomplish soil modification as described above. A variety of configurations are conceivable. For example, only tubular sections 74, as shown in FIG. 7, may be used to deliver reagent, while tubular sections 76 simply provide a woven, fabric-like feature or some other spacer-type of feature. Accordingly, tubular sections 76 may be substituted for other structures that are not tubular and might not function as reagent delivery tubes. Further, for example, only a selected portion of tubular sections 74 might be used for reagent delivery. Because the boundary of modified soil can extend beyond the diameter of an individual tubular section 74, the reagent delivery tubes in matrix 70 need not be directly adjacent to one another. Some number of tubular sections 74 or thoer non-tubular structures can exist between the tubular sections 74 used for reagent delivery. Even so, the overlapping boundaries of modified soil around individual reagent delivery tubes can still provide an area of modified soil such as modified soil 16, modified soil 26, or some alternative.

In FIG. 8, a matrix 80 is illustrated wherein reagent flow 72 is supplied through tubular sections 84 and tubular sections 86. Tubular sections 84 and 86 intersect to form reagent distribution junctions 88. Because tubular sections 84 and 86 are linked by distribution junctions 88, reagent flow 72 supplied at a single tubular section, or a few tubular sections, will quickly spread throughout matrix 80. The spacing between parallel tubular sections 84 and parallel tubular sections 86 may be greater than the distance between parallel tubular sections 74 and 76 illustrated in FIG. 7. A greater distance may be warranted given the potentially increased cost of fabricating matrix 80 with distribution junctions 88, as compared to a woven fabric of matrix 70 with cross-overs 78. FIG. 8 illustrates matrix 80 as having distribution junctions 88 at each intersection of tubular sections 84 and 86. Nevertheless, it is conceivable that distribution junctions 88 may only be provided at a portion of the intersections.

In FIG. 9, a matrix 90 is illustrated wherein reagent flow 72 is supplied into a tubular section 94 which distributes reagent flow 72 to multiple tubular sections 96. Tubular sections 96 are further provided with one or more spacers 99 to maintain tubular sections 96 in an approximately parallel configuration. Thus, FIG. 9 represents simply one additional variation on the reagent delivery apparatuses described in FIGS. 7 and 8. Other variations are, of course, encompassed by the present invention.

Depending on the placement and configuration of the apparatuses of FIGS. 7–9, such apparatuses can accomplish reagent delivery wherein one or more reagent delivery tubes are in contact with a soil. At least a portion of at least one of the tubes can include a wall that is permeable to a reagent. If desired, the reagent delivery tubes can be in subsurface contact with the soil. Preferably, the tubes can individually comprise a major portion sized and oriented to provide an individual vertical distance of reagent distribution in the soil and an individual horizontal distance of reagent distribution in the soil greater than the vertical distance. As illustrated in FIGS. 7–9, a reagent delivery apparatus may also be provided comprising a reagent distribution matrix. At least a portion of the matrix can include a plurality of parallel tubular sections and a wall permeable to the reagent, the wall being in contact with a soil, perhaps in subsurface contact.

Each of FIGS. 7–9 further illustrates how such an apparatus can comprise one or more spacers extending between adjacent tubular sections. Such structures can comprise a dual function of both a spacer and a tubular section. The longitudinal axis of at least a portion of the tubular sections in the apparatuses in FIGS. 7–9 can be oriented within about 45° of horizontal. Thus, the unique tubing orientation of FIGS. 3 and 4 can be provided by the apparatuses of FIGS. 7–9.

In yet another aspect of the present invention, a reagent delivery apparatus can comprise a reagent distribution matrix, wherein at least a portion of the matrix comprises a wall permeable to reagent, a first plurality of parallel tubular sections, and a second plurality of parallel tubular sections. If desired, the reagent delivery tubes can be in subsurface contact with the soil. The longitudinal axis of at least a portion of the first tubular sections can be substantially perpendicular to a longitudinal axis of at least a portion of the second tubular sections. FIGS. 7 and 8 each illustrate such an apparatus.

In yet another aspect of the invention, soil contamination is treated by forming one or more zones of oxidized material in the path of percolating groundwater, such as modified soil portions 16 of FIG. 1. The zone is formed by delivering an oxidizing agent into the ground for reaction with an existing soil component. The oxidizing agent modifies the existing soil component creating the oxidized zone. Subsequently when soil contaminates migrate into the zone, the oxidized material is available to react with the contaminates and degrade them into benign products.

The existing soil component can be any oxidizable soil component that, at least in oxidized form, is capable of contributing to the degradation of a soil contaminate. In one aspect the existing soil component is a naturally occurring oxidizable inorganic material such as a mineral. Once formed, the oxidized form of the soil component can then react with other soil constituents such as metals, organics, and radionuclides associated with or moving through the oxidized zone under natural gradients.

Abundant oxidizable soil components include the metals manganese and iron and some of their oxide forms (i.e., manganese dioxide and ferrous oxides). As an example, manganese can be oxidized to permanganate, a substance that is known to degrade volatile organic compounds, such as TCE and DCE. It is believed that the degradation pathway for TCE reacting with permanganate proceeds through the formation of an intermediate cyclic complex with subsequent breakdown to benign substance (e.g. carboxylic, carbon dioxide, chloride ions) and manganese dioxide. Permanganate may be regenerated by the reoxidation of manganese dioxide. Similar processes also occur for metallic iron and its oxide forms.

Manganese useful in practicing the present invention is present in small amounts in most crystalline rocks. As a weathering product of crystalline rocks it may be redeposited as various minerals, but chiefly as pyrolusite. Manganese containing minerals are also found in limestones and clays. Examples of other minerals containing manganese include tourmaline, axinite, pryolusite, psilomelane, wolframite, manganite, columbite-tantalite, franklinite, rhodonite, rhodocrosite, the amphilboe group of minerals, johannsenite and augite.

The existing geologic material, such as manganese, can be oxidized by reaction with any oxidant of sufficient strength to oxidize at least a portion of the existing geologic material. In one advantageous aspect of the invention, the oxidant reacts with the existing soil material in a reaction that results in a minimum of toxic byproducts. In one particular aspect the oxidant is ozone. It is believed that the oxidation of manganese to permanganate using ozone produces essentially no toxic byproducts, as the decomposition product of ozone is oxygen. Alternatively, the oxidant could be hydrogen peroxide, which likewise decomposes into harmless byproducts.

The oxidant can be delivered to the soil by any known method, including for example any of the delivery methods disclosed above. For instance when the oxidant is gaseous ozone, delivery of ozone to the soil can be accomplished by the apparatus and procedures described in U.S. Pat. No. 5,205,927 to Wickramanayake titled "Apparatus for Treatment of Soils Contaminated with Organic Pollutants," which is hereby incorporated by reference.

Figure 10:
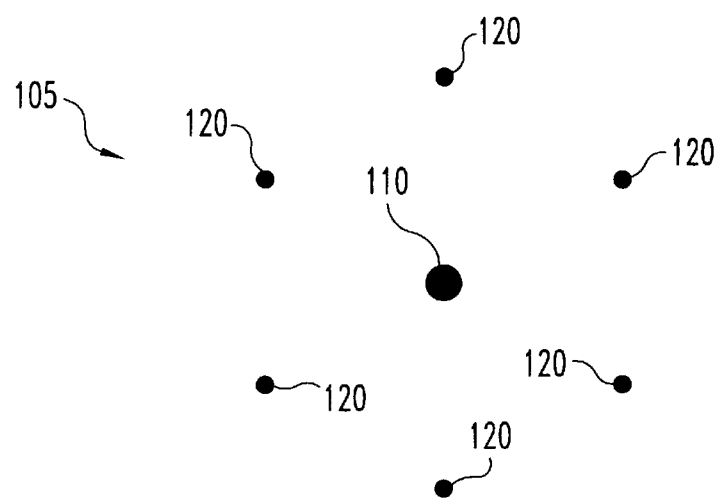
FIG. 10 is a top schematic view of a well system useful in creating an oxidized barrier.

In another aspect, an oxidant is delivered to the soil through a system of injection and extraction wells. Turning now to FIG. 10, a top view of an oxidant injection system 105 as installed in the ground is shown. Center injection well 110 is surrounded by a number of extraction wells 120. The oxidizing reactant is injected into the subsurface through the center well 110, for example under positive pressure. Negative pressure is then applied at the extraction wells 120 to help draw the oxidant through the soil allowing the oxidant to react with soil constituents as it is drawn from well 110 to well 120. Accordingly, the well system 105 as configured in FIG. 10 would produce a generally circular barrier zone around well 120 and generally within the circle created by wells 120. It is understood that the relative depth of the barrier zone can be controlled by the subsurface location and configuration of the individual wells. Other configurations of injection and extraction wells can also be utilized as would occur to those of skill in the art.

The injection system 105 including injection and extraction wells is believed to be of particular applicability to situations where the soil components to be oxidized are within the unsaturated soil portion. Moreover, where the oxidant is gaseous, the system 105 can serve to create a relatively large oxidized barrier zone in a relatively short period due to the high rate of permeability of gas through soil.

Figure 11:
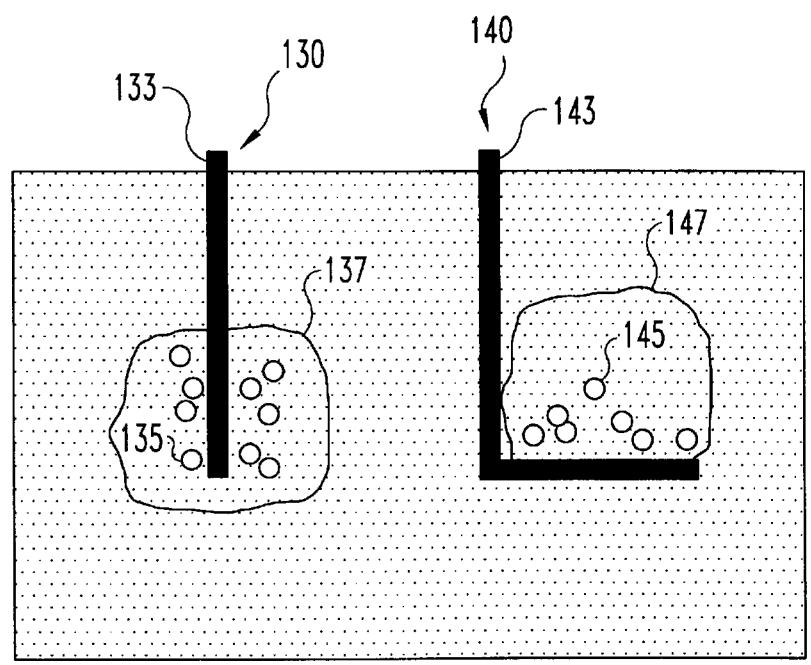
FIG. 11 is a side sectional view illustrating delivery of a reactive gas to saturated soil portions.

In other aspects, a sparging well delivery system can be utilized. Turning now to FIG. 11, systems 130 and 140 are shown. System 130 includes a vertical sparging well 133 that extends into the subsurface and at least partially into a saturated groundwater. Bubbles of injected gaseous oxidant 135 exit the well 133 and react with the groundwater forming a zone 137 of oxidized groundwater. System 140, like system 130 has a sparging well 143 that extends into the subsurface and at least partially into a saturated groundwater zone. However, well 143 has a horizontal portion from which bubbles 145 exit to react with the groundwater and form zone 147 of oxidized groundwater.

In forming and utilizing an oxidized reactive barrier according to aspects of the present invention, it is generally advantageous to first identify a site of soil contamination. The site should have at least one contaminate that is susceptible to degradation to benign products by reaction with an oxidant. Then, one can identify a direction of likely contaminate migration or percolation, or equivalently, one can assume migration in all directions.

One next can select the soil site for barrier formation. The barrier site would likely have a contaminate level relatively lower than the soil contaminate site. The barrier site can also be located a distance away from and spaced apart from the contamination site, and the barrier can be located in the determined path of contaminate migration.

Once the site is selected, one next can identify the soil components to be oxidized to form the barrier. The relative concentration and abundance of the identified components can then be determined by any known method or by estimation. If the identified component is not naturally present in sufficient quantity to form an adequate barrier, for instance if the native soil content of the identified mineral is too low, an alternative component can be identified or the soil can be supplemented or otherwise modified to cause an adequate supply of existing oxidizable component to be present.

After determining the amount or approximate amount of the selected oxidizable soil components existing in the soil, the oxidant is added to oxidize the selected soil component. The oxidant is added until a substantial amount of the available selected component is oxidized. The amount should be sufficient to create an oxidized barrier such that levels of a contaminate percolating through the barrier is substantially reduced. For instance, the reduction can be at least about 20%, more preferably 50% and most preferably at least about 75% degradation of the contaminate percolating into the barrier.

On one aspect, the addition of oxidant ceases once a sufficient amount of oxidant has been added to the soil to create the barrier. After the barrier is formed, the barrier remains and is available to reduce the level of contaminates percolating through the barrier for a time after the addition of oxidant has ceased. This time is preferably at least one day and more preferably on the order of several weeks and most preferable as long as several months to a year. If convenient, equipment used to deliver the oxidant, such as ozone injection equipment, may optionally be removed and deployed at another location once the barrier is formed.

In one useful application, a barrier is created where the amount of contaminate percolating through a particular zone of soil is relatively low. In other applications, a barrier or series of barriers are created to contain and treat higher levels of contaminate concentrations. It is understood that for a fixed amount of oxidized material, the life of the barrier, and consequently the need to refresh or recharge the barrier, would be shortened by exposure to higher levels of contamination percolation. It is also believed that the passage of time will contribute to barrier degradation. Accordingly, depending on the application, additional oxidant can be periodically reinjected to oxidize the existing soil component, which may become reduced or spent over time.

It is understood that the addition of the oxidizing agent to the soil to create the oxidized barrier can have advantageous soil remediation effects by virtue of at least three different mechanisms. First, if there is contaminate already present in the area, the oxidant can react directly with the contaminant to produce a degraded contaminant and benign products. Second, the oxidant can react with the natural mineral to produce an oxidized species that in turn reacts with a contaminate to produce a degraded contaminate and a benign byproducts. Third, the oxidant can regenerate a reduced species that had previously reacted with a contaminate, for example iron (Fe2+), to allow the regenerated reduced species to again react with a contaminate.

It is also understood that the reactive barrier formed according to aspects of the present invention is formed in situ and utilizes existing soil components as a substantial portion of the barrier. Accordingly, the overall hydrogology and permeability of the soil can be relatively unaffected because the barrier utilizes existing soil components. Only an oxidant need be added to the soil to form the reactive barrier, though additional materials may optionally be added to modify the soil in any desired manner.

By forming the barrier by the in situ oxidation of existing soil components, the addition of potentially harmful materials to the soil can be avoided. For example where existing manganese is oxidized with ozone in situ, permanganate can be created in the soil where the only byproduct is oxygen. In this sense, the reactive barrier is formed in a process that is not disruptive to the existing soil composition.

This is to be contrasted with the direct addition of permanganate to the soil. In this latter procedure, permanganate is formed above ground and provided to the soil as part of a compound. Aside from the problems associated with creating and handling the permanganate and finding a suitable injection medium, the injection of permanganate as a compound is a substantial modification of the soil and can lead to undesireable results. For example when injected as potassium permanganate, equal amounts of potassium are necessarily injected along with the permanganate, and high concentrations of potassium can be considered a soil contaminate, causing among other things water discoloration.

In still other aspects of the invention, an oxidizing reactive barrier can be used in combination with other reactive barriers, such as barriers of reduced material. An example of a barrier of reduced material are those constructed by reducing iron by injecting dithionite as disclosed in U.S. Pat. No. 5,783,088 to Amonette et al. titled "Method of Removing Oxidized Contaminants from Water," the disclosure of which is hereby incorporated by reference. In one advantageous aspect, a series of oxidizing and reducing barriers can be constructed in spaced apart alignment in the path of contamination percolation. For example a series of concentric rings about a contaminate site or a series of parallel walls in the path of groundwater percolation are two such designs. By constructing a series of diverse barriers in this way, more various contaminates percolating in the groundwater can be degraded by such a multi-barrier system. Contaminates that are not degraded by one barrier, for example the reduced barrier, can be degraded by the other barrier and vice versa.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method for treating soil pollution comprising:
   forming a barrier of oxidized soil material by delivering a gaseous oxidizing agent into the ground to oxidize an existing soil component, wherein the barrier is formed in the path of contaminate migration;
   reacting the oxidized soil material with a quantity of soil contaminate subsequently migrating into the barrier to reduce the level of the soil contaminate migrating through the barrier to an acceptable level.

2. The method of claim 1 wherein the oxidizing agent is ozone.

3. The method of claim 1 wherein the existing soil component is a mineral.

4. The method of claim 3 wherein the existing soil component is a naturally occurring mineral.

5. The method of claim 4 wherein the existing soil component is manganese.

6. The method of claim 5 wherein the oxidizing agent is ozone.

7. The method of claim 1 wherein the soil contaminate is a volatile organic compound.

8. The method of claim 7 wherein the oxidant is ozone.

9. The method of claim 8 wherein the existing soil component is manganese.

10. The method of claim 1 wherein the reacting of the oxidized soil material with a quantity of soil contaminate occurs at least about 24 hours after delivery of the oxidizing agent ceases.

11. A reactive barrier formation method comprising:
    identifying a quantity of minerals in the subsurface;
    delivering a quantity of an oxidizing agent into the subsurface to oxidize the identified minerals,
    wherein the quantity of delivered oxidizing agent is sufficient to oxidize the identified minerals to form a reactive barrier of oxidized soil material,
    the reactive barrier comprising a sufficient quantity of oxidized soil material to reduce the level of a soil contaminate subsequently migrating through the barrier to an acceptable level.

12. The method of claim 11 wherein the oxidizing agent is gaseous.

13. The method of claim 12 wherein the quantity of minerals comprise manganese.

14. The method of claim 12 wherein the oxidizing agent is ozone.

15. The method of claim 14 wherein the soil contaminate is a volatile organic compound.

16. The method of claim 15 wherein the quantity of minerals comprise manganese.

17. The method of claim 11 wherein the oxidizing agent is selected from the group consisting of hydrogen peroxide and ozone.

18. A method for preventing the spread of soil pollution comprising:
    identifying a site of soil contamination wherein the soil is contaminated by at least one soil contaminate susceptible to degradation to benign products by reaction with an oxidant;
    determining a direction of contaminate migration;
    injecting an oxidizing agent into the ground in the path of the contaminate migration;
    reacting the injected oxidizing agent with a naturally occurring soil component to form a treatment barrier of the oxidized naturally occurring soil material;
    the treatment barrier being formed of a sufficient quantity of oxidized soil material to reduce the quantity of the soil contaminate subsequently migrating through the barrier to an acceptable level before the soil contaminate leaves the barrier.

19. The method of claim 18 further comprising reacting the oxidized soil material with contaminate migrating into the treatment barrier.

20. The method of claim 19 wherein the oxidizing agent is gaseous.

21. The method of claim 19 wherein the naturally occurring soil component comprise minerals.

22. The method of claim 21 wherein the minerals comprise manganese.

23. The method of claim 22 wherein the oxidized naturally occurring soil material comprises permanganate.

24. The method of claim 22 wherein the oxidizing agent is ozone gas.

25. The method of claim 21 wherein the oxidizing agent is selected from the group consisting of hydrogen peroxide and ozone.

26. A reactive barrier formation method comprising:
    positioning one or more reagent delivery tubes in subsurface contact with a soil;
    supplying an oxidizing reactive reagent to the soil through the tube;
    reacting the oxidizing reactive reagent with a naturally occurring component of the soil to form a reactive barrier;
    the reactive barrier reacting with soil contaminates subsequently migrating into the barrier to reduce the level of soil contaminates migrating through the barrier to acceptable levels.

27. The method of claim 26 wherein the oxidizing reactive reagent is ozone.

28. The method of claim 26 wherein the naturally occurring component of the soil comprises a soil mineral.

29. The method of claim 26 wherein the oxidizing reactive reagent is selected from the group consisting of hydrogen peroxide and ozone.

30. A method for treating soil pollution comprising:
    forming a barrier of oxidized soil material by delivering an oxidizing agent into the ground to oxidize an existing soil component, wherein the oxidizing agent is selected from the group consisting of ozone and hydrogen peroxide, and wherein the barrier is formed in the path of contaminate migration;
    reacting the oxidized soil material with a quantity of soil contaminate subsequently migrating into the barrier to reduce the level of the soil contaminate migrating through the barrier to an acceptable level.

31. The method of claim 30 wherein the existing soil component is a mineral.

32. The method of claim 31 wherein the existing soil component is a naturally occurring mineral.

33. The method of claim 32 wherein the existing soil component is selected from the group consisting of tourmaline, axinite, pryolusite, psilomelane, wolframite, manganite, columbite-tantalite, franklinite, rhodonite, rhodocrosite, the amphilboe group of minerals, johannsenite and augite.

34. The method of claim 33 wherein the existing soil component is pyrolusite.

35. The method of claim 30 wherein the soil contaminate is a volatile organic compound.

36. The method of claim 35 wherein the existing soil component is manganese.

37. The method of claim 36 wherein the oxidant is ozone gas.

* * * * *